(No Model.)
J. J. RALYA.
SAW.
No. 381,814. Patented Apr. 24, 1888.
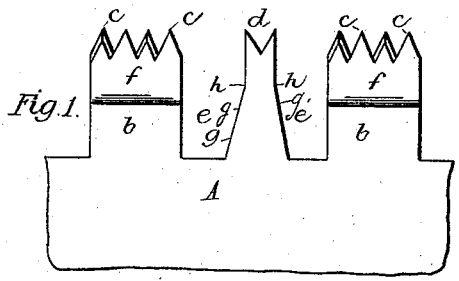
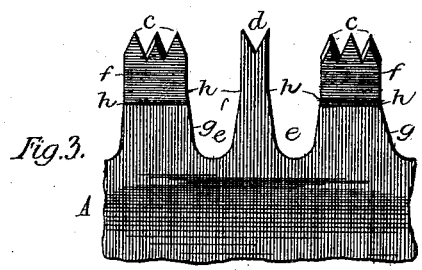
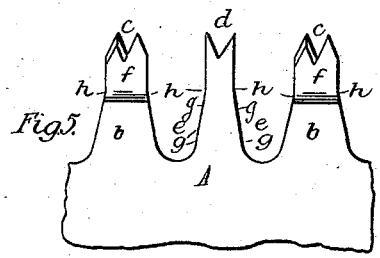
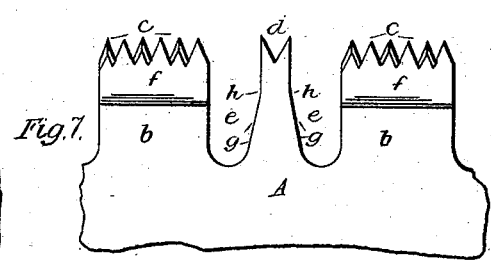
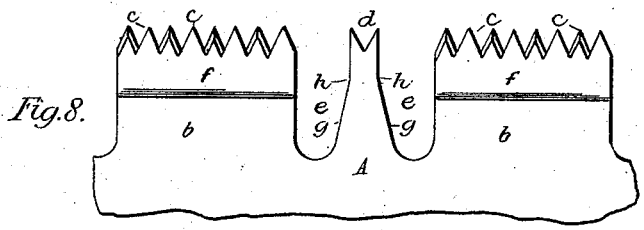
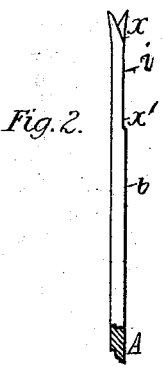
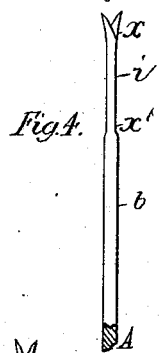
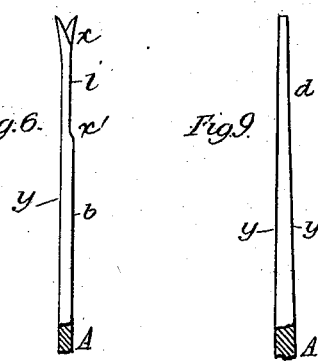
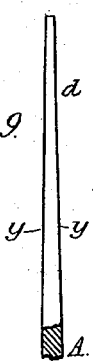
Witnesses.
Will T. Norton
Chas. Rhodes.
Inventor
John J. Ralya.
By his Attorneys John J. Halstead & Son

UNITED STATES PATENT OFFICE.

JOHN J. RALYA, OF SPRINGPORT, INDIANA.

SAW.

SPECIFICATION forming part of Letters Patent No. 381,814, dated April 24, 1888.

Application filed August 24, 1887. Serial No. 247,749. (No model.)

*To all whom it may concern:*

Be it known that I, JOHN J. RALYA, of Springport, in the county of Henry and State of Indiana, have invented certain new and useful Improvements in Saws; and I do hereby declare that the following is a full, clear, and exact description of the invention, which will enable others skilled in the art to which it appertains to make and use the same, reference being had to the accompanying drawings, and to letters of reference marked thereon, which form a part of this specification.

My invention has for its objects the allowing of about twice as many cutting-teeth in a given length of saw-blade, the affording of a largely-increased ventilating or clear space for the teeth when in action, giving them a greater stiffness or strength, causing them to stay set much longer than usual and to require sharpening much less frequently, and to cut faster. The particulars of construction whereby these objects are sought and attained will appear from the following description; and my invention may in part be called a further improvement on the saw shown and described in my patent, No. 364,131, dated May 31, 1887.

In the drawings, Figure 1 is an elevation, and Fig. 2 an edge view greatly enlarged, of a portion of a saw having four cutters on each tooth and made in accordance with my invention. Figs. 3 and 4 are similar views of a saw having three cutters on each tooth, and Figs. 5 and 6 similar views of one with only two cutters on each tooth. Figs. 7 and 8 show, respectively, six and eight cutters on each tooth; Fig. 9, an edge view of a modified form of drag-tooth; and Fig. 10 is an edge view of a cutter-tooth having a gradual taper on both sides.

Similar letters refer to similar parts in all the figures.

A is the body or blade of the saw; $b\,b$, its teeth; $c\,c$, the cutters of these teeth; $d\,d$, the drag-teeth; $e\,e$, the broad deep spaces between the cutter-teeth and the drag-teeth; $f\,f$, the edges of the upper narrower part of the teeth, made, as shown, parallel, or substantially so, at about right angles with the length of the body or blade A for a distance of, say, one-third the length of the teeth, and from that point they grow broader, as shown at $g$, and consequently stronger, down to their base or line where they meet the said blade. The lines of $f\,f$ thus meet the inclined lines $g\,g$ at obtuse angles at $h\,h$, and the lines or edges $g\,g$ thus meet the body or blade A also at obtuse angles. It will be evident from this that the teeth have great strength and resisting-power at those points where they are most needed. This feature of the obtuse angle, and consequently of the gradually-increased breadth and larger base and materially enhanced strength of the teeth I apply either to the drag-teeth or to the cutter-teeth, or to both, as will be perceived from the drawings.

By narrowing the breadth of the upper part of the drag teeth relatively to their broader and strong lower part I am enabled also to bring the points of these drag-teeth as closely together as can be practical, and hence I style them "concentrated teeth"—that is, they are grouped or concentrated close together, the inclined edges of each two adjacent cutters meeting each other at an angle and without having any blank or other space between them, such as is shown in my patent, No. 364,131, thus enabling me to have many more teeth grouped or concentrated in a given length or space. The same remark is applicable to the cutting-teeth. The result is that I can get nearly twice as many teeth in a saw of a given length as is usually done, and relatively, of course, nearly twice as much work out of it from this cause alone. These broad inclined bases have also other great advantages, among which may be named the following, viz: They allow of using a common flat file on them and at the angles and on the blades, and the teeth can always be gummed out with a file to keep them always of the same length, and as the teeth have the broad bases they can always be kept of their full length and of their exact original shape all the time by means of a file until the tooth is worn out.

It is not necessary to use the file often, if at all, on the upper narrower part, $f$, of the teeth any more perhaps than it would be necessary to grind the front flat side of a carpenter's plane; but the file, as a rule, need be used only on the lower or inclined parts, $g$, and on the blade A itself in order to keep the teeth and the ventilation or sawdust chamber (presently to be described) always the same. The broad strong base of the teeth also prevents their being strained or twisted around out of shape, or, as it is called by sawyers, "wabbled," and therefore the teeth cannot run crooked or "haggle" and cut through.

With my improvement much less labor is required in sawing as compared with saws as generally constructed.

Another feature of my improved saw is as follows, and to which I give the name of "side ventilation," and this feature may be used in all cross-cut and even in circular saws: To effect the side ventilation, or, rather, to give a clear space at the side of the teeth, causing the saw to run lighter and smoother, cut faster and straighter, and to require "setting" less frequently, besides other advantages, I make the teeth as follows: Commencing at the points of the teeth, I make the teeth (by grinding or otherwise) about one "gage" thinner from said points downward toward the base for a distance of, say, one and a quarter (1¼) inch. (See Fig. 2, in which $i$ indicates this thinner part, reaching from $x$ to $x'$, and from this point $x'$ this thinner part abruptly merges into the full thickness of the metal by what may be called a "rapid" curve or taper.) In some cases, instead of making this reduced thickness or ventilation-space all on one side only of the teeth, I reduce the metal on each side to the depth of a half-gage, so that the teeth shall be still in all about a full gage thinner at this portion.

In Fig. 6 I have shown the reduced thickness as made on one side by a gradual taper or incline, $y$, from the base of the tooth to its tip; and on the opposite side or face of the tooth the reduction extends, as first above described, down about one and one-fourth inch only from the tips, and from this point or line the blade retains its full thickness. The effect in sawing is substantially the same whether the reduced thickness be all on one side or part on each side, or whether it be made tapering from top to bottom, as named, or made "square," as it may be styled, as shown at $x\ x'$. The drag-teeth may preferably have both sides tapered similarly from base to tip. This reduced space also allows the presence of more air in the kerf, and to that extent acts as a ventilator and serves to lessen the tendency of the saw to get overheated. Some of the great advantages of this ventilating or reduced feature may be better appreciated by contrasting my improved construction with saws of ordinary or well-known construction—say, for instance, a crosscut saw, in which the teeth are usually much thicker at their points than at the base and very much thicker than the body or blade of the saw. In other words, the metal of the plate from which the saw is made is of gradually-increasing thickness throughout, its thickest part being at the tip of the teeth. Now, when the teeth cut from this thickest part of the metal are "set" wide enough to run long without "resetting," the saw will not cut fast, will not go straight, and will cut rough, whereas in my invention, and as above described, the teeth wear but little until they wear back from the points of the teeth and wedge down and run hard, from the fact that there is not left room enough to give the proper bend or set to the teeth without this feature of reduced thickness or "side ventilation," as I style it, because this allows the putting of any desired bend or set and to a small degree, and yet not have the points set out but a very little more than the thickness of the saw. With my construction, also, the teeth clear themselves.

For convenience I style that part of the teeth which broadens out from the parallel edges to the base the "elevated base."

I find by experience with my improved saws that as compared with those known to me made by others they will stay sharp about twice as long, stay set twice as long, cut twice as fast, and with about half the power.

When the gangs of cutters $c$ of the teeth $b$ are numerous—say, for instance, from four to eight in number—there is no need of broadening the base, as shown at $g$, because the breadth and strength are of themselves sufficient to prevent twisting, wabbling, and haggling.

Each or any of the cutters may be made with the double-bevel cutting-edges, as shown and described in my patent, No. 364,131, above named.

I claim—

1. A saw having its "drag-teeth" made with pointed tips meeting at an acute angle and having their outer edges extending in parallel lines from their points or tips for about one-third the length of the teeth, and thence diverging obtusely from such lines with a gradually-increasing breadth to the base of the teeth, as and for the purposes set forth.

2. A saw having its cutting-teeth made substantially as shown and described—that is, with a broad base-connection with the blade or body and gradually narrowing upward at its opposite edges for about two-thirds its length, then extending upward with substantially parallel sides and meeting at an obtuse angle the edges of the cutting-tips.

3. Saw-teeth on an elevated base having the side ventilation described—that is, with the elevated base thinned or reduced to about one gage thinner than the body of the plate from the tips of the cutting-teeth to a line considerably below the roots of such cutting-teeth.

4. A saw having its group of cutters or teeth provided with an elevated gradually-broadened base reaching to about two-thirds their height or length, as set forth, and having, also, drag-teeth with parallel sides extending down from their tips and then diverging at obtuse angles to the blade to form a broad elevated base, all as shown and described.

JOHN J. RALYA.

Witnesses:
JOHN S. HEDGES,
DAVID BOWEN.